United States Patent [19]

Blades

[11] 4,392,608

[45] Jul. 12, 1983

[54] THERMALLY RESPONSIVE FLUID AND ELECTRICAL SWITCH AND CONTROL SYSTEM

[75] Inventor: Brian J. Blades, Norton, Mass.

[73] Assignee: Texas Instruments Incorporated, Dallas, Tex.

[21] Appl. No.: 99,295

[22] Filed: Dec. 3, 1979

[51] Int. Cl.³ .......................................... G05D 23/10
[52] U.S. Cl. .................................... 236/48 R; 236/87; 337/365; 337/380
[58] Field of Search ............... 337/343, 349, 354, 365, 337/380; 236/48, 87, 101 R, 101 A, 101 E

[56] References Cited

U.S. PATENT DOCUMENTS

| | | | |
|---|---|---|---|
| 3,500,277 | 3/1970 | Nardulli | 337/343 |
| 3,768,057 | 10/1973 | Sekira et al. | 337/349 |
| 3,893,057 | 7/1975 | Beunk er al. | 337/380 |
| 4,026,464 | 5/1977 | Doherty | 236/48 R |
| 4,117,976 | 10/1978 | Doherty | 236/48 R |
| 4,142,676 | 3/1979 | Hattori | 236/87 |
| 4,144,998 | 3/1979 | Wakabayashi et al. | 236/87 X |

Primary Examiner—George Harris
Attorney, Agent, or Firm—James P. McAndrews; John A. Haug; Melvin Sharp

[57] ABSTRACT

A thermally responsive fluid and electrical switch particularly for use in an automotive engine control system has first and second housing means each with an open-ended well, the housing means being secured together so that the wells cooperate to form a switch chamber. Fluid ports and terminal apertures open into the second housing means, and terminals are mounted in the terminal apertures to extend into the chamber. Valve and contact means are disposed in the chamber. A thermally responsive snap acting disc is mounted in the chamber in heat-transfer relation to the thermally conducting first housing to move in response to selected temperature changes and motion transfer means move in the chamber with the disc for moving the valve means to regulate fluid flow between the ports and for moving the contact means to regulate the flow of electrical current between the terminals. Means in the chamber slidably engage the motion transfer means to sealingly separate the switch chamber into first and second portions respectively enclosing the valve and contact means. The switch is used in an automotive engine control system to be responsive to changes in engine temperature for actuating vacuum means and electrical means to regulate operating parameters of the engine in accordance with corresponding changes in engine temperature.

7 Claims, 6 Drawing Figures

THERMALLY RESPONSIVE FLUID AND ELECTRICAL SWITCH AND CONTROL SYSTEM

BACKGROUND OF THE INVENTION

The field of this invention is that of thermally responsive controls, particularly a control which regulates fluid flow in response to temperature changes and which also regulates an electrical circuit in response to the same changes in temperature.

Thermally responsive snap-acting thermostat metal discs have been used in a variety of automotive applications for performing various control functions in response to selected changes in engine temperature. In some applications for example the discs have been used to operate valves in vacuum lines, thereby to regulate the application of manifold vacuum for effecting distributor spark advance, exhaust gas recirculation or the like when engine temperature has reached a desired level. It is now proposed that various electronic controls utilizing microprocessors and the like be provided for regulating operation of automotive engines to achieve improved fuel economies and efficiencies. For this purpose it has been proposed that sensor means be arranged to provide inputs to the electronic controls representative of various engine operating parameters such as engine temperature. In this regard, it would be desirable to be able to use manifold vacuum for effecting distributor spark advance or the like at a selected engine temperature while also being able to simultaneously provide an electrical input to an electrical or electronic control means indicating that the spark advance or other event had occurred. It would also be desirable if the thermally responsive control means used for such multiple purposes were adapted to provide digital signal output to facilitate signal processing in the electronic control means, were adapted to be easily modified to operate at different selected temperatures, and were also adapted for low cost mass production to find wide application in engine control system for automobiles in all price categories.

It is an object of this invention to provide a novel and improved thermally responsive control; to provide a novel and improved thermally responsive fluid and electrical switch; to provide such a switch which is particularly adapted for regulating operation of vacuum means in an automotive engine control system while also regulating operation of electrical means in that control system; and to provide such a switch having a construction which is adapted to be mass produced at reasonable cost. It is also an object of this invention to provide such an automotive engine control system utilizing such a novel and improved thermally responsive fluid and electrical switch.

SUMMARY OF THE INVENTION

Briefly described, the thermally responsive switch of this invention comprises a first thermally conducting metal housing having an open-ended well and a second housing means also having an open-ended well. The two housing means are secured together so that the wells cooperate to form a switch chamber. The second housing means has a plurality of ports opening into the chamber. Electrical terminals also extend into the chamber; thermally responsive means are disposed in the chamber in close heat-transfer relation to the first housing means for movement in response to selected changes in temperature; valve means are disposed in the chamber to be actuated by movement of the thermally responsive means for regulating fluid flow between the ports; and contact means are disposed in the chamber to be actuated by movement of the thermally responsive means for regulating the flow of electrical current between the terminals.

The second housing means preferably comprises a cupshaped housing part molded of an organic material having a well with an open end and a closed end, having at least two ports opening into the well near the closed end of the well, and having a pair of terminal apertures which extend through the housing part to open near the open end of the well. A valve seat is preferably formed integral with the cup-shaped housing part and a valve member is movable in the well between open and closed valve positions respectively spaced from and engaging the valve seat for regulating the flow of fluid between the ports. Switch terminals are mounted in the respective terminal apertures to extend into the switch chamber from the exterior of the switch. The second housing means then further includes a bushing having a central bore, the bushing being formed of an electrical insulating material and being adapted to be press-fitted into the well in the second housing part. The contact means of the switch preferably comprise a pair of resilient contact members which are mounted on one end of the insulating bushing so that first ends of the members extend over the bushing bore to be resiliently movable between open and closed circuit positions respectively spaced from and engaging each other and so that the opposite ends of the member extend outside the outer diameter of the bushing. In that arrangement, the opposite ends of the contact members are resiliently engaged and electrically connected to the respective terminals as the contact mounting bushing is press-fitted into the second housing well.

The thermally responsive means used in the switch preferably comprises a snap-acting thermostat metal disc which is disposed in the switch chamber in close heat transfer relation to the first thermally conducting metal housing. The disc has an original dished configuration and is adapted to move with snap action between that original dished configuration and an inverted dished configuration when the disc is heated or cooled to selected actuating temperatures. The thermally responsive means also includes motion transfer means which extend from the disc to the contact means and through the bore in the contact member mounting bushing to the valve means. The motion transfer means move with the snap-acting disc for moving the valve and contact means between their respective open and closed valve and circuit positions as the disc moves in response to the selected temperature changes. Preferably seal means are mounted on the contact member mounting bushing to slidably engage the motion transfer means, thereby to cooperate with the bushing in dividing the switch chamber into separate sealed portions respectively enclosing the valve and contact means of the switch.

In a preferred embodiment of the invention, the thermally responsive fluid and electrical switch is incorporated in an automotive engine control system which includes vacuum means and electrical means, the switch being arranged to control operation of the vacuum and electrical means in accordance with selected changes in engine temperature for regulating selected operating parameters of the engine.

DESCRIPTION OF THE DRAWINGS

Other objects, advantages and details of the improved thermally responsive fluid and electrical switch and of the improved automotive engine control system of this invention appear in the following detailed description of preferred embodiments of the invention, the detailed description referring to the drawings in which.

Figure 1:
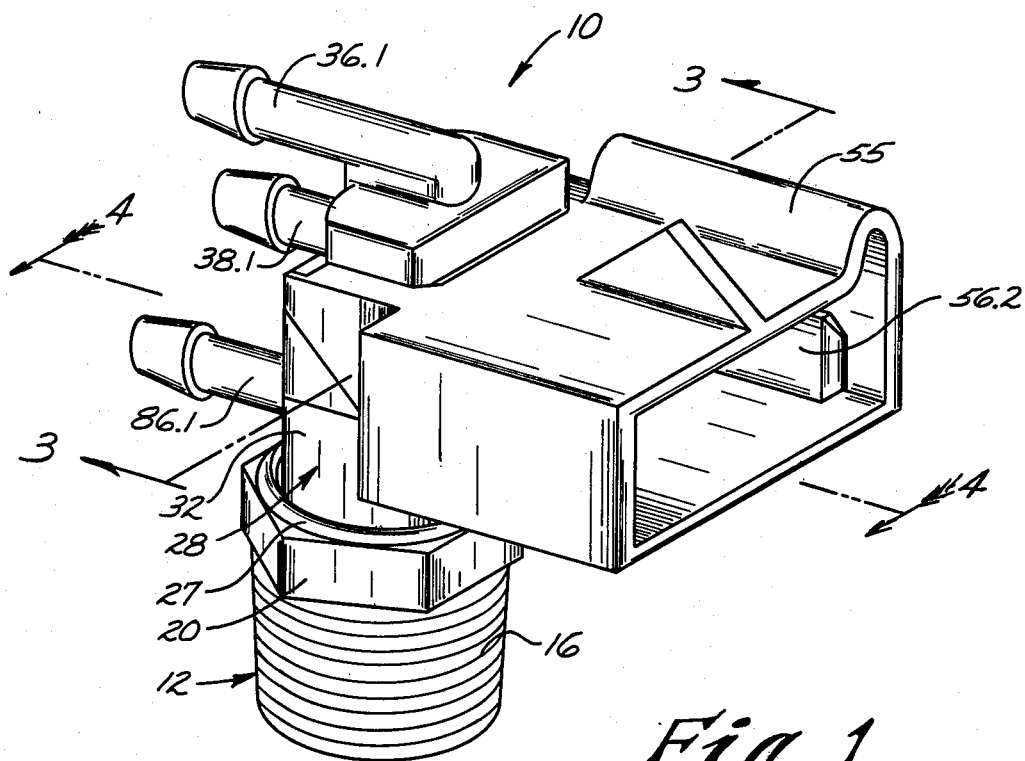
FIG. 1 is a perspective view of the novel and improved thermally responsive fluid and electrical switch provided by this invention.
Figure 2:
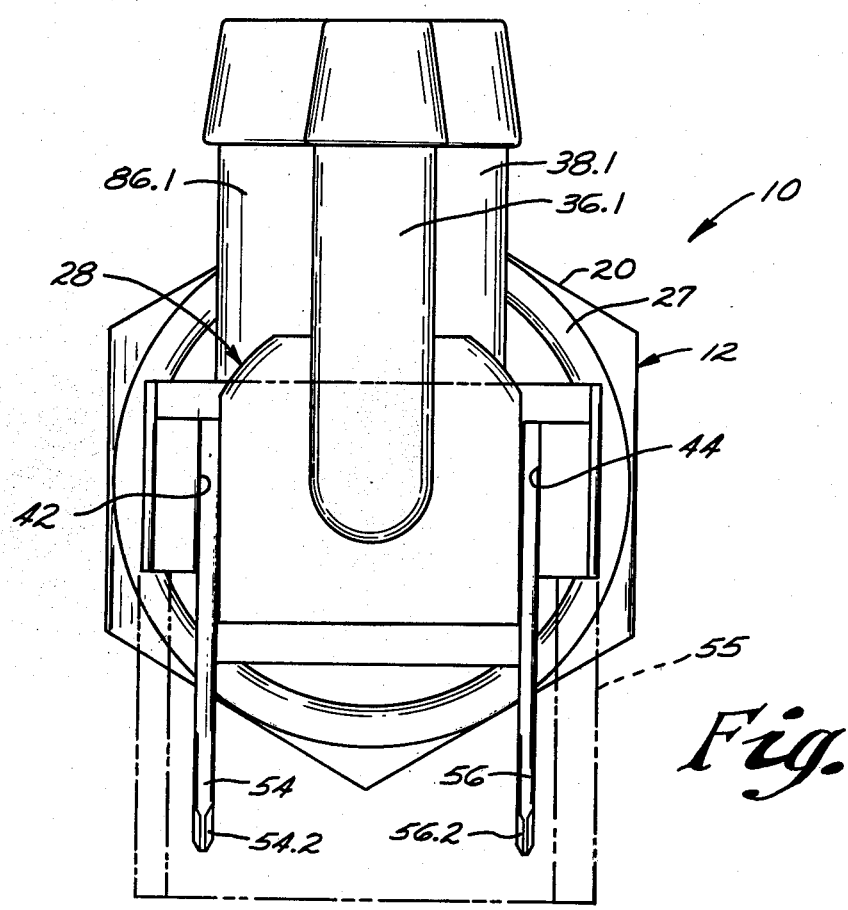
FIG. 2 is a plan view of the switch of FIG. 1 shown to enlarged scale with a hood portion of the switch removed to facilitate illustration of the switch terminals.

Referring to the drawings, 10 in FIGS. 1-6 indicates the novel and improved thermally responsive fluid and electrical switch or control device of this invention which is shown to include a first, thermally conducting metal housing 12 having a well 14 which is open at one end 14.1 and closed at its opposite end 14.2. The housing preferably comprises a machined part of brass or other material of relatively high thermal conductivity and preferably has external screw threads 16 at its closed end for use in mounting the switch 10 in close heat-transfer relation to an automotive engine 18 or other object whose temperature is to be monitored as is diagrammatically illustrated in FIG. 3. In the preferred embodiment of the invention, the first housing has a hexagonal portion 20 to be gripped by a wrench for facilitating mounting of the switch, has a first step or shoulder 22 formed by a counter bore in the open end of the housing well 14, and has a second step or shoulder 26 adjacent a thin flange or rim portion 27 of the housing which extends around the open end of the well 14.

Figure 3:
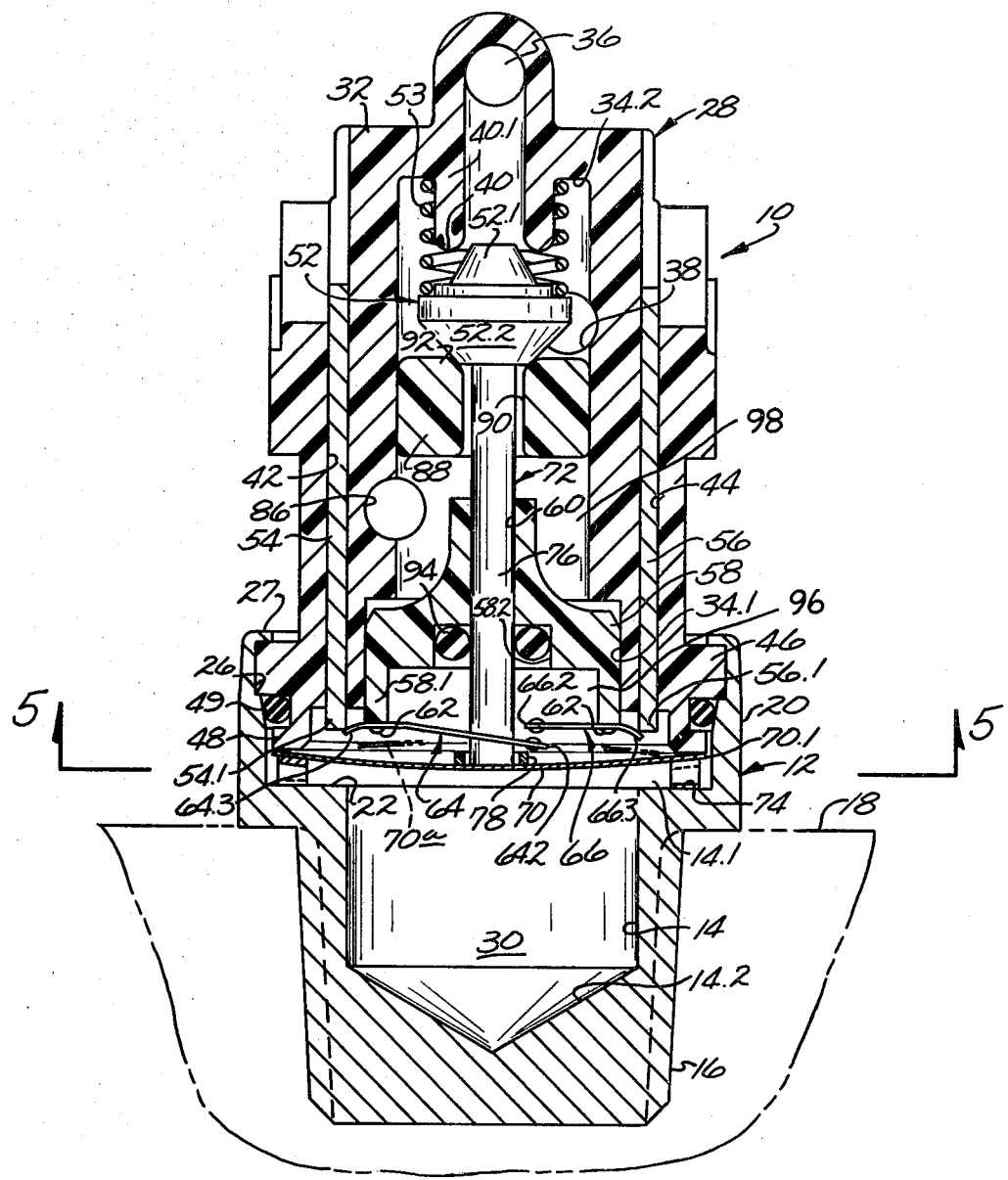
FIG. 3 is a section view to the enlarged scale along line 3—3 of FIG. 1.

The switch 10 also includes a second housing means 28 having an open-ended well, the first and second housing means being secured together so that the two wells cooperate to form a switch chamber 30. Preferably for example the second housing means 28 includes a generally cup-shaped housing part 32 molded of an organic polycarbonate material or the like having a well 34 which is open at one end 34.1 and closed at its opposite end 34.2. The molded housing part 32 has at least two ports 36 and 38, each with a nipple 36.1 and 38.1, opening into the well 34 near the closed end of the well. In addition, the housing 32 also has a valve seat located within the well 34 between the ports 36 and 38. Preferably, for example, a rounded valve seat 40 which is integral with the housing port 32 is located to extend around the port 36. The housing part 32 also has a pair of terminal apertures 42, 44 which extend through the housing part to open near the open end 34.1 of the well as is best seen in FIG. 3. The housing part preferably has an annular flange 46 extending around the well 34. The flange 46 rests on the step or shoulder 26 of the first housing, the rim or flange 27 of the first housing then being rolled or swaged over the flange 46 for securing the first and second housing means together so that the wells 14 and 34 cooperate to form the switch chamber 30. In that arrangment an annular abutment or locating surface 48 extending around the open end of the well 34 is precisely spaced relative to the shoulder 22 on the first housing. If desired, an O-ring gasket 49 or the like is entrapped and compressed between the two housing means for sealing the switch chamber 30 in that location.

In accordance with this invention, a valve member is located in the switch chamber 30 for movement between open and closed valve positions respectively spaced from and engaging the noted valve seat 40 for regulating the flow of fluid through the switch chamber 30 between the ports 36 and 38. Preferably for example, a valve member 52 having a first tapered end 52.1 is positioned in the well 34 to be movable between the open valve position shown in FIGS. 3 and 4 where the tapered valve portion 52.1 is spaced from the valve seat 40 and a closed valve position where the tapered valve portion engages and bears against the valve seat 40. In a preferred embodiment of the switch 10, the valve seat 40 is located on a neck portion 40.1 of the housing part 32 and a coil spring 53 is fitted over the neck for normally biasing the valve member to its open valve position spaced from the valve seat 40.

In accordance with this invention, a pair of terminals 54, 56 are mounted in the respective terminal apertures 42, 44 in the second housing part so that the terminals extend from the exterior of the switch to locations adjacent the open well end 34.1 within the switch chamber 30. Preferably, for example, the terminals are generally L-shaped and are press-fitted into the apertures 42, 44 for locating the ends 54.1 and 56.1 of the terminals at selected locations on either side of the open end of the well in the second housing part 32. Typically a hood 55 is secured to the exterior of the housing part 32 in any conventional way for protecting the opposite ends 54.2, 56.2 of the terminals while otherwise disposing the terminal ends to be received within a mating plug or the like.

In addition, a pair of contact means are located in the switch chamber 30 for movement between open and closed circuit positions respectively spaced from and engaging each other for regulating the flow of electrical current through the switch between the terminals 54 and 56. Preferably for example the second housing means 28 also includes a contact means mounting bushing 58 having a central bore 60. The bushing is provided with integral molded pins 62 at one end 58.1 of the bushing. Resilient contact members 64, 66 each formed of beryllium copper or the like and each having suitable spring and conductivity properties are secured to the bushing end 58.1 by having contact member apertures 64.1, 66.1 fitted over the pins 62 and by having the pins headed over by heat or ultrasonic fusion or the like, whereby first ends 64.2, 66.2 of the contact members extend over the bushing bore 60 and opposite ends 64.3, 66.3 of the resilient contact members extend outside the outer diameter 58.2 of the bushing. In that arrangement, the first ends of the contact members are resiliently movable between open and closed circuit positions wherein the contact members are respectively spaced from and engaged with each other over the bore 60 as will be understood. The bushing 58 is then pushed into the well 34 in the second housing part 32 to a desired extent such that the opposite ends 64.3, 66.3 of the contact members resiliently engage and are electrically connected to the respective terminals 54, 56. In that arrangement, movement of the contact members between said open and closed circuit positions is adapted to regulate current flow between the device terminals.

Figure 4:
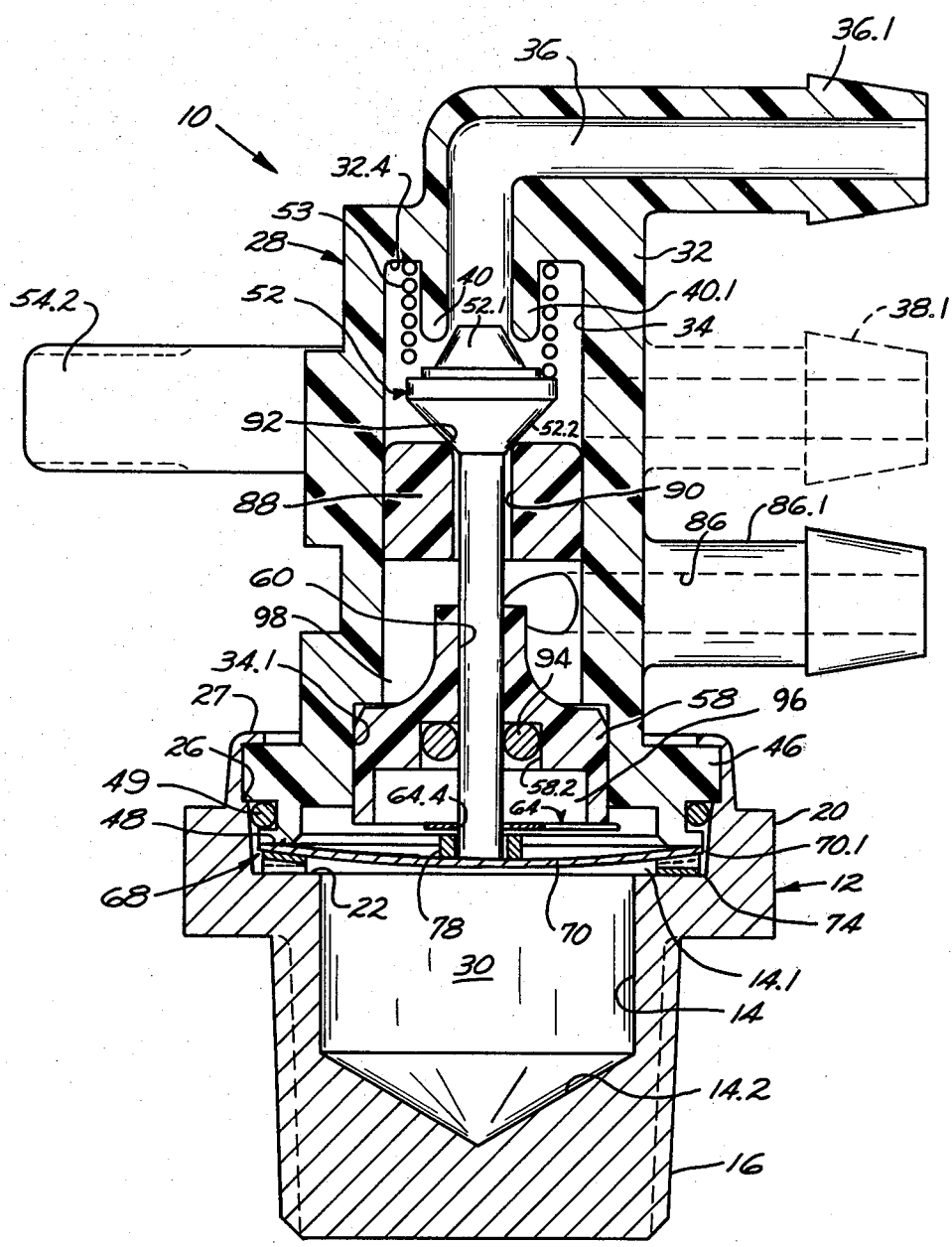
FIG. 4 is a section view to the enlarged scale along line 4—4 of FIG. 1.
Figure 5:
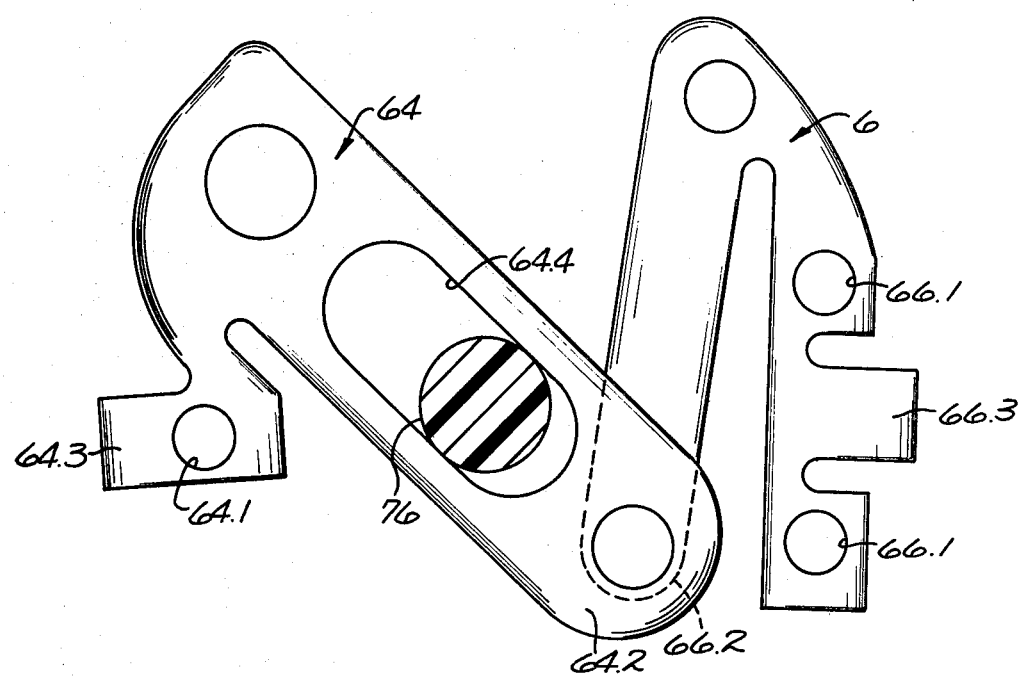
FIG. 5 is a section view along line 5—5 of FIG. 3.

In the switch 10 of this invention, thermally responsive means 68 are also disposed in the switch chamber 30 in close heat-transfer relation to the thermally conducting first housing 12 and are adapted to move in the chamber in response to selected changes in temperature for moving the valve and contact means between their noted open and closed valve and circuit positions. Preferably for example the thermally responsive means includes a conventional thermally responsive snap-acting dished thermostat metal disc or element 70 and motion transfer means 72. The disc element has an original dished configuration such as is shown in FIGS. 3 and 4 and is adapted to move with snap action from that original dished configuration to an inverted dished configuration when the disc is heated to a first selected actuating temperature. The disc is also adapted to return to its original dished configuration with snap-action when the disc is subsequently cooled to a second, relatively lower actuating or reset temperature. The disc is disposed in the switch chamber 30 so that the disc perimeter 70.1 is alinged with and is adapted to react against the locating abutment 48 as the disc moves between said dished configurations. A wave spring or washer 74 of thermally conducting metal material or the like is preferably disposed between the disc perimeter and the step 22 of the first housing party for maintaining the disc in a desired position in the chamber while assuring that the disc is in close heat-transfer relation to the thermally conducting housing part 12.

The motion transfer means 72 are disposed between the thermally responsive disc 70 and the valve and contact means for transmitting disc movement to those valve and contact means. Preferably for example, a motion transfer rod 76 extends through an opening 64.4 in the contact member 64 and through the bushing bore 60 between the disc and the valve member 52. A motion transfer cylinder 78 is fitted around the rod to extend between the disc and the contact member 64. In that arrangement movement of the disc in response to temperature change is adapted to move the valve and contact means between their open and closed positions as noted above.

In a preferred embodiment of the switch 10, an additional port 86 having a nipple 86.1 is provided in the second housing part 32 to open into the well 34. An additional bushing 88 having a central bore 90 and having an additional valve seat 92 located around the bore is positioned in the well 34 and is secured therein by a press fit in the well so that the additional valve seat is located between the ports 38 and 86, so that the bushing bore 90 fits around the motion transfer rod 76, and so that the valve seat 92 has a selected location relative to the valve seat 40. The valve member 52 is also preferably provided with a second tapered portion 52.2 at its opposite end. That is, the additional bushing 88 is located so that, when the valve member 52 is in its open valve position relative to the valve seat 40, the second tapered portion 52.2 of the valve member engages and bears against the valve seat 92 in a closed valve position relative to that valve seat for preventing fluid flow between the ports 38 and 86 while permitting fluid flow between the ports 38 and 36. Conversely the location of the bushing 88 is such that when the valve member 52 is in its closed valve position relative to the valve seat 40 for terminating fluid flow between passages 38 and 36, the valve member is in open valve position relative to seat 92 permitting fluid flow between ports 38 and 86 through the bore 90.

In a preferred embodiment of the invention, the contact means mounting bushing 58 is provided with a gasket groove 58.2 around the bore 60 and an O-ring gasket 94 or the like is seated in the groove to slidably and sealingly engage the motion transfer rod 76 passing through the bore, whereby the bushing and gasket cooperate to divide the switch chamber 30 into separate first and second portions 96 and 98 sealed from each other for respectively enclosing the valve and contact means of the switch. In that arrangement, the bushing 58 and gasket 94 further serve to guide motion of the rod 76 in response to movement of the disc 70.

In a typical arrangement of the switch 10, the disc 70 is disposed as shown in FIGS. 3 and 4 wherein the switch is mounted on an engine 18 or other object to be monitored and wherein the valve member 52 is positioned to permit fluid flow between ports 38 and 36 and to prevent fluid flow between ports 38 and 86, the switch contacts 64 and 66 being disposed in an open circuit position as shown in FIGS. 3 and 4. When the engine 18 is heated to the first actuating temperature of the disc 70, the disc moves with snap action to its inverted dished configuration indicated by the partial broken line 70a in FIG. 3 for moving the valve member to close off fluid flow to port 86 and to permit fluid flow to port 36 while also moving the contact member to closed circuit position. On subsequent cooling of the engine below the reset temperature of the disc 70, the disc snaps back to its original dished configuration permitting the valve member to return to its original position under bias of the spring 53 and to permit the contact members 64, 66 to return to their open circuit position in response to their own inherent resilience. Thus the switch 10 is closely responsive to changes in engine temperatures for regulating or switching fluid flow through the control device and for also regulating electrical current flow between device terminals in response to the same changes in temperature. The fluid and contact portions of the switch are sealed from each other but are both responsive to the same temperature changes in a convenient, reliable and economical manner. A disc having other thermal response characteristics than the disc 70 is easily substituted for the disc 70 when the switch is being assembled to adapt the device for any desired temperature response.

Figure 6:
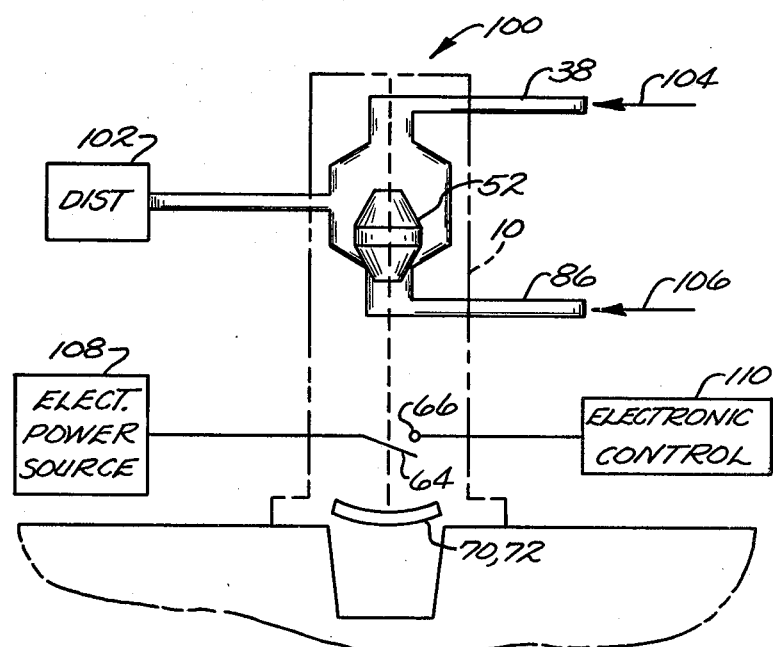
FIG. 6 is a schematic view diagrammatically illustrating use of the switch of FIGS. 1-5 in the novel and improved automotive engine control system of this invention.

In a preferred embodiment of this invention, the switch 10 as above described is employed in an automotive engine control system 100 such as is diagrammatically and schematically illustrated in FIG. 6. That is, the switch is incorporated in an engine control system having a distributor 102 or the like which is operable by manifold vacuum for spark advance purposes or the like when the engine is heated to a selected temperature. The control system also includes an electrical power source 108 and an electric control means 110 or the like such as might be employed for regulating fuel supply or the like to the engine 18 and which might therefore require adjustment as the distributor spark advance occurs at the selected engine temperature. In accordance with this invention, the switch 10 is arranged with the ports 38 and 86 arranged to receive vacuum from the engine carburetor and intake manifold as indicated by arrows 104 and 106 respectively while the port 38 is connected to the spark advance means of the distributor. The terminals 54, 56 of the switch are connected between the power source and the electronic control. Accordingly, when the engine 18 is started, the thermally responsive means 70, 72 of the switch permit carburetor vacuum to be applied to the distributor while the contact members 64, 66 are in open circuit position. However, when the engine reaches the selected actuating temperature of the disc 70, the valve member 52 is moved to permit manifold vacuum to be applied to the distributor for achieving the desired spark advance while the contact members 64, 66 are moved to closed circuit position to provide a control signal to the electronic control to indicate that the spark advance event has occurred. When the engine operation is subsequently terminated so that the engine cools, the switch 10 returns to its original condition to prepare the control system for reinitiation of engine operation. As the specific control system in which the switch 10 is employed can take many forms in automotive applications and otherwise it is not further described herein and it will be understood that the switch 10 is adapted to be used in various control systems wherein vacuum or other fluid means and electrical current means are each adapted to be regulated in response to corresponding changes in temperature.

It should be understood, also, that various modifications of the preferred embodiments of the switch and control system described above are possible within the scope of this invention and that the invention includes all equivalents of the disclosed embodiments falling whithin the scope of the appended claims.

I claim:

1. A thermally responsive fluid and electrical switch comprising
    a first thermally conductive metal housing means having an open-ended well therein,
    a second housing means having an open-ended well and having port means opening into the well, the second housing means being secured to the first housing means so that the wells cooperate to form a switch chamber therebetween,
    electrical terminal means extending into the switch chamber,
    thermally responsive means also disposed in the switch chamber in close heat-transfer relation to the first housing means for movement in response to selected changes in temperature,
    valve means also disposed in the switch chamber actuable by movement of the thermally responsive means for regulating fluid flow in the port means in accordance with said changes in temperature, and
    electrical contact means also disposed in the switch chamber actuable with the valve means for regulating electrical current flow in the terminal means in accordance with said selected changes in temperature.

2. A thermally responsive switch comprising
    first thermally conductive metal housing means having an open-ended well therein,
    second housing means having an open-ended well and having port means opening into the well, the second housing means being secured to the first housing means so that the wells cooperate to form a switch chamber,
    electrical terminal means extending into the chamber,
    thermally responsive means disposed in the chamber in close heat-transfer relation to the first housing means for movement in response to selected changes in temperature,
    means dividing the chamber into first and second portions,
    valve means in the first portion of the chamber to be actuable by movement of the thermally responsive means for regulating fluid flow in the port means in accordance with said changes in temperature,
    electrical contact means in the second portion of the chamber to be actuable with the valve means for regulating electrical current flow in the terminal means in accordance with said selected changes in temperature, the second housing means being formed of electrical insulating material, said contact means comprising a pair of resilient contact members mounted in said second portion of the chamber on said insulating housing portions to extend over the well in said second housing means and to be movable between open and closed circuit positions respectively spaced from and engaged with each in response to movement of the thermally responsive means and motion transfer means extending through the dividing means in movably sealing relation thereto for moving the valve means to regulate fluid flow in response to movement of the thermally responsive means.

3. A thermally responsive fluid and electrical switch comprising
    first thermally conductive metal housing means having an open-ended well therein,
    second housing means having an open-ended well and having port means opening into the well, the second housing means being secured to the first housing means so that the wells cooperate to form a switch chamber,
    electrical terminal means extending into the chamber,
    thermally responsive means disposed in the chamber in close heat-transfer relation to the first housing means for movement in response to selected changes in temperature,
    valve means in the chamber actuable by movement of the thermally responsive means for regulating fluid flow in the port means in accordance with said changes in temperature, and
    electrical contact means in the chamber actuable with the valve means for regulating electrical current flow in the terminal means in accordance with said selected changes in temperature, the second housing means including a cup-shaped housing part having a well with an open end and a closed end and having a pair of terminal apertures extending through the housing part adjacent to the open well end, and a bushing of electrical insulating material having a central bore press-fitted into the well, said terminal means comprising terminals mounted in the respective terminal apertures to extend into the switch chamber from outside the switch, and said contact members being mounted on one end of the bushing with first ends of the members extending over the bushing bore to be movable between said open and closed circuit positions and with opposite ends of the members being resiliently engaged with the respective terminals.

4. A thermally responsive switch a thermally responsive fluid and electrical switch comprising
    first thermally conductive metal housing means having an open-ended well therein,
    second housing means having an open-ended well and having port means opening into the well, the second housing means being secured to the first housing so that the wells cooperate to form a switch chamber, electrical terminal means extending into the chamber, thermally responsive means disposed in the chamber in close heat-transfer relation to the first housing means for movement in response to selected changes in temperature, valve means in the chamber actuable by movement of the thermally responsive means for regulating fluid flow in the port means in accordance with said changes in temperature, and electrical contact means in the chamber actuable with the valve means for regulating electrical current flow in the terminal means in accordance with said selected changes in temperature, said port means comprising a pair of ports opening into the well in the second housing means, said valve means comprising a valve seat located in the chamber between the ports and a valve member movable in the chamber between open and closed valve positions respectively spaced from and engaging the valve seat, and said thermally responsive means comprising a dished disc element of thermostat metal disposed in the chamber in heat-transfer relation to the first housing means to be movable with snap action between an original dished configuration and an inverted dished configuration in response to selected changes in temperature, said thermally responsive means further including motion transfer means movable with the dished disc element for moving said valve and contact members between their respective open and closed valve and circuit positions as the dished disc element changes configuration.

5. A thermally responsive switch as set forth in claim 4 having said valve means and said contact means disposed in respective first and second portions of the switch chamber and having seal means disposed in the chamber slidably engaging said motion transfer means for permitting said movement of the valve and contact means in the chamber in response to movement of the dished disc element while separating said first and second portions of the chamber in sealed relation to each other.

6. A thermally responsive fluid and electrical switch comprising a first cup-shaped thermally conducting metal housing having a well with an open end and a closed end, having a flange around the open well end, and having means for securing the first housing in heat-transfer relation to an object whose temperature is to be monitored, a second cup-shaped housing of an electrical insulating material having a well with an open end and a closed end and having a flange around the open well end, the second housing having a pair of ports opening into the well adjacent to the closed well end, having a valve seat around one of the ports, and having a pair of apertures extending through the housing adjacent the open well end, said housing flanges being secured together so that the wells cooperate to form a switch chamber, a valve member disposed in a first portion of the switch chamber for movement between first and second valve positions respectively spaced from and engaging the valve seat for regulating fluid flow through the first chamber portion between the pair of ports, terminals mounted in the respective housing apertures to extend from the switch exterior to locations in a second portion of the switch chamber adjacent to the open end of the second housing well, a bushing of electrical insulating material having an axial bore press-fitted into the second housing well, a pair of resilient contact members mounted on one end of the bushing with first ends of the contact members resiliently engaging the respective terminals and with opposite ends of the contact members extending over the bore to be movable in the second chamber portion between open and closed circuit positions respectively spaced from and engaging each other for regulating flow of electrical current between the terminals, a thermally responsive dished disc element of thermostat metal disposed in the chamber in close heat-transfer relation to the metal housing to move with snap action from an original dished configuration to an inverted dished configuration in response to selected changes in housing temperature, motion transfer means disposed between the disc element and the valve and contact members with a portion thereof extending through the bushing bore for moving the valve and contact members between their respective valve and circuit positions in accordance with movement of the disc element in response to said selected changes in housing temperature, and seal means mounted on the bushing and slidably engaging the motion transfer means for cooperating with the bushing to separate the first and second chamber portions in sealed relation to each other.

7. A switch as set forth in claim 6 having an additional port in the second housing opening into the first portion of the switch chamber and having a second bushing with an axial bore and with a second valve seat around the bore press-fitted in the second housing well between said additional port and one of said pair of ports, the valve member being engaged with the second valve seat when the member is in said first valve position and being spaced from the second valve seat when the member is in said second valve position thereby to regulate fluid flow between said additional port and said one port.

* * * * *